(12) United States Patent
Nishioka

(10) Patent No.: US 7,643,227 B2
(45) Date of Patent: Jan. 5, 2010

(54) LENS SYSTEM AND OPTICAL APPARATUS

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/699,639

(22) Filed: Jan. 29, 2007

(65) Prior Publication Data
US 2007/0195433 A1 Aug. 23, 2007

(30) Foreign Application Priority Data
Feb. 23, 2006 (JP) .............................. 2006-046747

(51) Int. Cl.
*G02B 9/04* (2006.01)
(52) U.S. Cl. ...................................................... 359/793
(58) Field of Classification Search ................ 359/691, 359/793, 646, 717
See application file for complete search history.

(56) References Cited
U.S. PATENT DOCUMENTS

2002/0175693 A1 11/2002 Starr et al.
2003/0227415 A1 12/2003 Joannopoulos et al.
2005/0157409 A1* 7/2005 Nishioka ..................... 359/726
2005/0231826 A1* 10/2005 Murakami et al. .......... 359/754
2006/0072211 A1* 4/2006 Imamura ..................... 359/686
2006/0238897 A1* 10/2006 Nishioka ..................... 359/745
2007/0065068 A1* 3/2007 Wang ............................ 385/8

* cited by examiner

*Primary Examiner*—Alicia M Harrington
(74) *Attorney, Agent, or Firm*—Kenyon & Kenyon LLP

(57) ABSTRACT

A lens system includes a first lens which is formed of a medium exhibiting negative refraction, and a second lens having a positive refractive index. Accordingly, it is possible to provide a lens system in which a negative refractive index medium for which a curvature of field is reduced. Moreover, it is also possible to have a lens system in which a lens having a positive focal length and a lens having a positive focal length, which is made of a positive refractive index medium, are combined.

17 Claims, 8 Drawing Sheets

LENS SYSTEM AND OPTICAL APPARATUS

CROSS-REFERENCE TO RELATED APPLICATION

The present application is based upon and claims the benefit of priority from the prior Japanese Patent Application No. 2006-46747 filed on Feb. 23, 2006; the entire contents of which are incorporated herein by reference.

BACKGROUND OF THE INVENTION

1. Field of the Invention

The present invention relates to a lens system.

2. Description of the Related Art

Optical systems such as an optical device, an imaging optical system, an observing optical system, a projection optical system, and a signal processing system, in which light or electromagnetic waves are used, and optical apparatuses in which such optical systems are used, have hitherto been known. These optical systems have a drawback that a resolution is limited due to a diffraction which occurs due to wave nature of light or electromagnetic waves.

Therefore, as a technology for realizing an image formation beyond this diffraction limit, using a negative refractive index medium has been mentioned in Literature, "Physical Review Letters, Volume 85, Pages 3966 to 3969, 18 (2000)" by J. B. Pendry, and Literature "Optical Express, Volume 12, No. 20, Pages 4835 to 4840 (2004)" by L. Liu and S. He.

FIG. 7 is a diagram which describes this technology in which, an image formation by a plane-parallel plate 380 formed of a negative refractive index medium 301, is shown. In FIG. 7 t0 . . . a distance between an object point and a left-side surface of the plane-parallel plate 380 t0' . . . a distance between the object point and a right-side surface of the plane-parallel plate 380 t . . . a thickness of the plane-parallel plate 380 i . . . an angle of incidence r . . . an angle of refraction ns . . . a refractive index of the negative refractive index medium 301 with respect to vacuum.

A refractive index of a medium around the plane-parallel plate 380 with respect to vacuum is n0, and in a case of the vacuum, n0=1. FIG. 7 shows a case when n0=1, and ns=−1.

An arrow shows a propagating light emitted by an object. According to the Non-patent Literature "Physical Review Letters, Volume 85, Pages 3966 to 3969, 18 (2000)" by J. B. Pendry, since the law of refraction holds true, $$n0 \sin i = ns \sin r \qquad \text{expression 101}$$

and when n0=1 and ns=−1, then $$r = -i \qquad \text{expression 102.}$$

Consequently, propagating light component is focused to an image point where the following expression 103 is satisfied.

$$t0 + t0' = t \qquad \text{expression 103}$$

On the other hand, evanescent waves emitted by the object point are restored at a point, where t0' satisfies the expression 103 and have the same intensity as the intensity at the object point. Since both the propagating and the evanescent light emitted by the object are focused at the image point, an image formation beyond the diffraction limit is realized. This is called as perfect imaging. It has hitherto been known from the Non-patent Literature "Physical Review Letters, Volume 85, Pages 3966 to 3969, 18 (2000)" by J. B. Pendry, that the perfect imaging is realized when expression 103 and the following expression 104 hold true, even when an area around the negative refractive index medium 301 is not a vacuum.

$$ns = -n0 \qquad \text{expression 104}$$

In this patent application, a term "light" also includes electromagnetic waves such as microwaves and terahertz waves.

On the other hand, when the image is formed, a single lens inevitably involves a curve of an image plane. Therefore, when a lens 601 having a curved surface as in FIG. 8 is made of the negative refractive index medium 301, a curvature of field occurs. As it is evident from FIG. 8, a principal ray 604 other than an axis passing through a center of an aperture stop 602 forms an image on an image plane 605 having a curvature different from a Gauss plane 603.

SUMMARY OF THE INVENTION

The present invention provides a lens system in which a negative refractive index medium for which curvature of field is reduced, is used.

In one aspect of the present invention, there can be provided a lens system which on one side surface, includes a first lens which is formed of a medium exhibiting negative refraction, and a second lens which is formed of a medium having a positive refractive index. In the present invention, the first lens and the second lens are names assigned to two lenses, and do not indicate an order in which these lenses are disposed.

Moreover, in another aspect of the present invention, it can provide a lens system which includes a first lens which is formed of a medium exhibiting negative refraction, and a second lens which is formed of a medium exhibiting negative refraction.

DETAILED DESCRIPTION OF THE INVENTION

Exemplary embodiments of the present invention will be described below in detail by referring to the accompanying diagrams. However, the present invention is not limited to the embodiment described below.

First Embodiment

Figure 1:
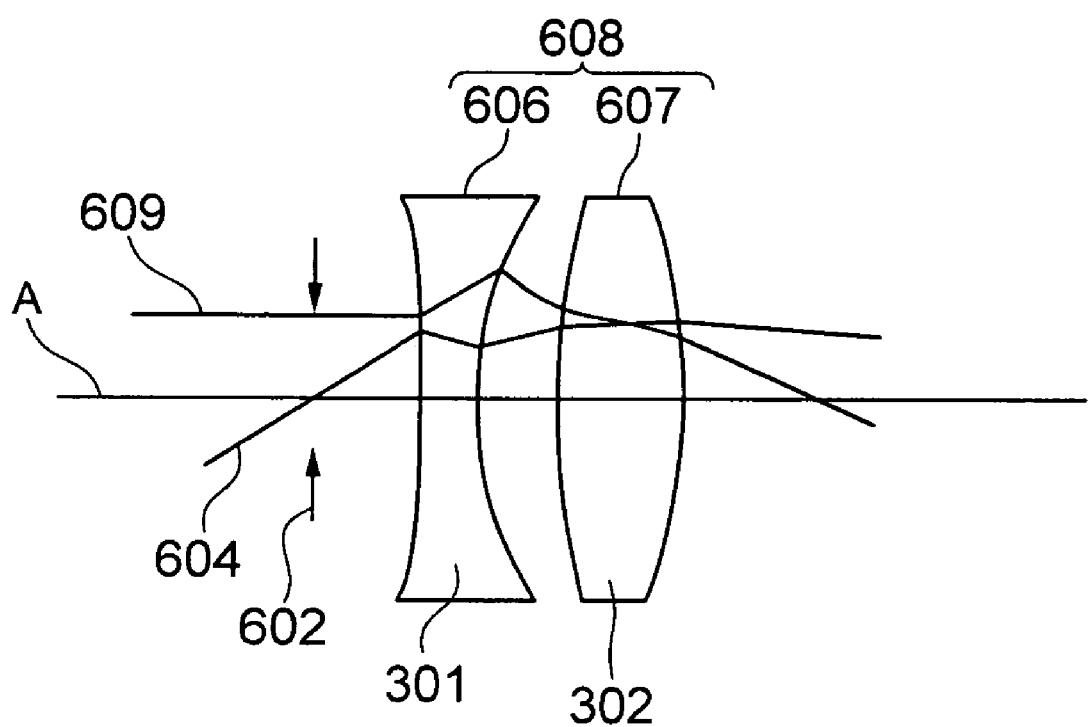
FIG. 1 is a diagram showing a structure of a lens system according to a first embodiment of the present invention.

A first embodiment of the present invention will be described below. FIG. 1 shows an example of the present invention, in which a lens system 608 is shown. In the lens system 608, a lens 606 having a positive focal length f1, which is made of a negative refractive index medium 302 and a lens 607 having a positive focal length f2, which is made of a positive refractive index medium 302 are combined.

When a relative refractive index of the negative refractive index medium 301 with respect to a surrounding medium is let to be n'1, and a relative refractive index of the positive refractive index medium 302 with respect to a surrounding medium is let to be n'2, then the following expression 105 and expression 106 hold true.

$$n'1<0 \qquad \text{expression 105}$$

$$n'2>0 \qquad \text{expressions 106.}$$

Moreover, the following expression 107 and expression 108 also hold true.

$$f1>0 \qquad \text{expression 107}$$

$$f2>0 \qquad \text{expression 108}$$

A requirement for eliminating curvature of field when two thin lenses are brought closer is that Petzval sum is zero. In other words, in a case of the lens system 608, the following expression 109 holds true.

$$1/(f1 \cdot n'1)+1/(f2 \cdot n'2)=0 \qquad \text{expression 109}$$

Here, when expressions 105 to 108 are taken into consideration, it is noticed that expression 109 is satisfied when f1, f2, n'1, and n'2 are selected appropriately. Consequently, it is possible to eliminate the curvature of field.

Furthermore, since the focal length is positive for both the lenses 606 and 607, it is also possible to have a lens which has a strong positive power. In a lens system which includes two lenses in which a normal positive refractive index medium such as glass and plastic is used, when the Petzval sum is eliminated, a sign of the focal length of each lens changes, and it has been difficult to achieve a strong power (power is considered in terms of an absolute value without the sign). However, in the present invention, this is not the case. For satisfying expression 107, it is necessary that at least one surface of the lens 606 is a concave surface.

Figure 2:
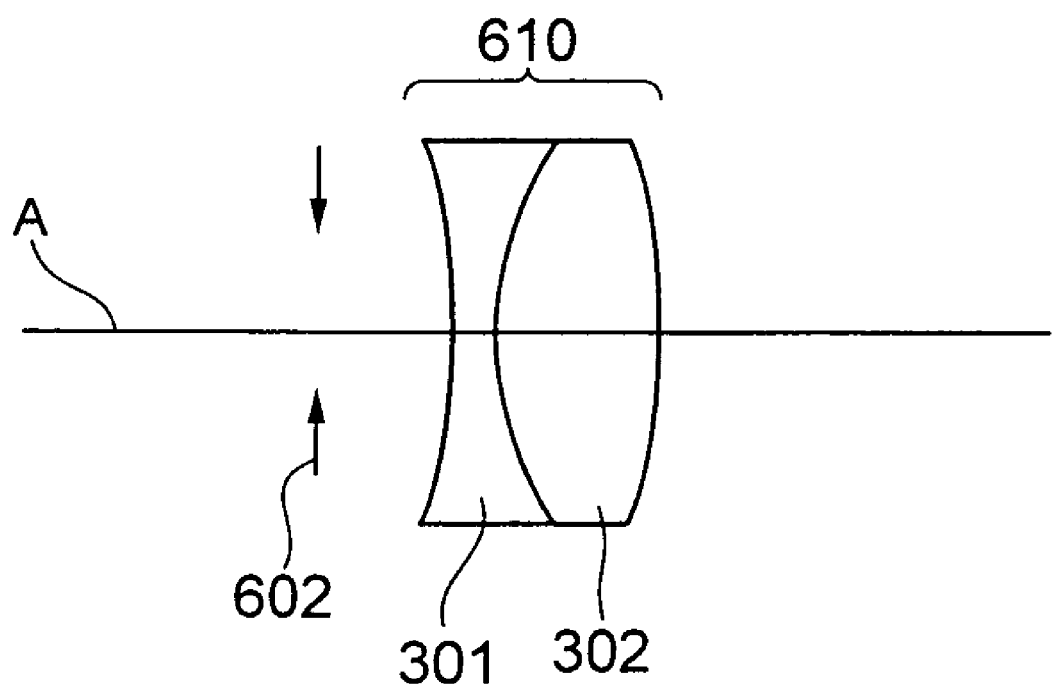
FIG. 2 is a diagram showing a structure of a lens system according to a modified embodiment.

In the system in FIG. 1, the two lenses may be cemented by an adhesive etc., and let to be one lens 610 as in FIG. 2. Moreover, an order of the lens 606 and the lens 607 on an optical axis A may be reversed.

Second Embodiment

Figure 3:
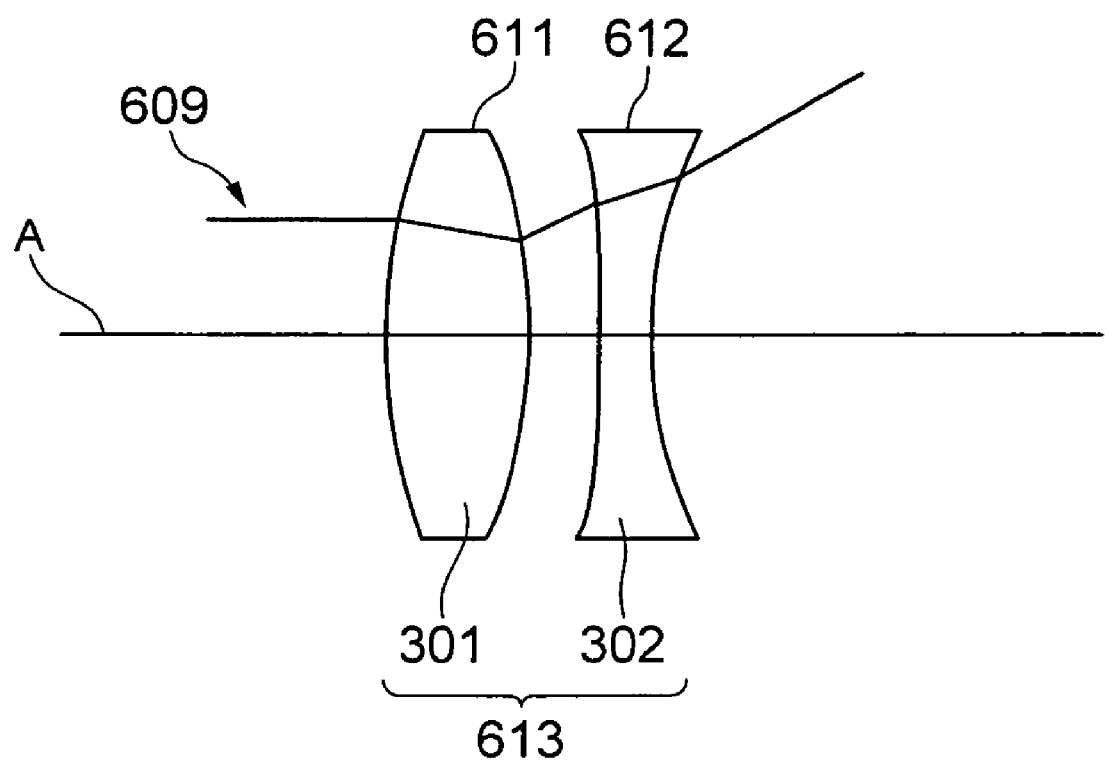
FIG. 3 is a diagram showing a structure of a lens system according to a second embodiment.

Next, lens system 613 which includes two lenses 611 and 612, both having a negative focal length as shown in FIG. 3 will be taken into consideration.

The lens 611 is formed of the negative refractive index medium 301, and the lens 612 is formed of the positive refractive index medium 302.

When a focal length of the length 611 is let to be f3, and a focal length of the length 612 is let to be f4, it is possible to satisfy the following expression 110 by selecting appropriately f3, f4, n'1, and n'2.

$$1/(f3 \cdot n'1)+1/(f4 \cdot n'2)=0 \qquad \text{expression 110}$$

Consequently, it is possible to achieve a lens system in which curvature of field due to strong negative power is removed. Here, the following expression 110-1 and expression 110-2 hold true.

$$f3<0 \qquad \text{expression 110-1}$$

$$f4<0 \qquad \text{expression 110-2}$$

In FIG. 3, the lens 611 and the lens 612 may be cemented by an adhesive. An order of the lens 611 and the lens 612 on the optical axis A may be reversed, since it does not have any effect on Petzval sum.

Practically, expression 109 may not hold true strictly. There are many optical systems in which the expression 109 may not be satisfied.

$$-|1/(3fT)| \leq 1/(f1 \cdot n'1)+1/(f2 \cdot n'2) \leq |1/(3fT)| \qquad \text{expression 111}$$

In an optical system with a narrow angle of view, the following expression 112 may be satisfied.

$$-|1/fT| \leq 1/(f1 \cdot n'1)+1/(f2 \cdot n'2) \leq |1/fT| \qquad \text{expression 112}$$

According to a product which uses an optical system, the following expression 113 may be satisfied.

$$-|10/fT| \leq 1/(f1 \cdot n'1)+1/(f2 \cdot n'2) \leq |10/fT| \qquad \text{expression 113}$$

Here, fT is a focal length of the entire lens system 608.

In expression 111, expression 112, expression 113, when the focal lengths f1 and f2 are replaced by the focal lengths f3 and f4, the expressions hold true even for a system in FIG. 3. In this case, fT is a focal length of the entire lens system 613.

Examples of combinations of the focal length and the refractive index of two lenses which are capable of reducing the curvature of field are shown in table 1

TABLE 1

Combinations of two lenses capable of reducing curvature of field

| | Combination | | | |
|---|---|---|---|---|
| | 1 | 2 | 3 | 4 |
| Refractive index of first lens | − | − | + | − |
| Focal length of first lens | + | − | + | + |
| Refractive index of second lens | + | + | + | − |
| Focal length of second lens | + | − | − | − |
| Focal length of entire system | + | − | Ind | Ind |
| Effect of enhancing absolute value of power | Sub | Sub | Sm | Sm |
| Embodiment | 1 | 2 | | | where "Ind" denotes indefinite,
"Sub" denotes substantial, and
"Sm" denotes small.

Combination 1 corresponds to the first embodiment, and combination 2 corresponds to the second embodiment. Combination 3 is a combination of lenses which has hitherto been known. In a cast of combination 4, since focal length of the two lenses have opposite signs, an effect of enhancing the absolute value of power is small, but an effect of reducing a curvature of field is shown. When a refractive index of a first lens is negative and a refractive index of a second lens is positive, by selecting appropriately the focal length of each lens, the effect of enhancing the absolute value of power of the entire system while reducing the curvature of field is shown.

Figure 4:
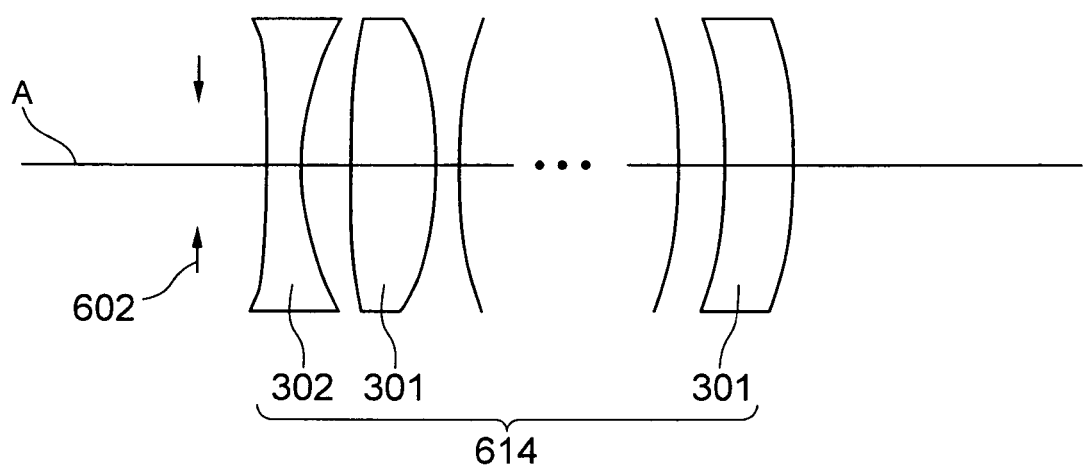
FIG. 4 is a diagram showing a structure of a lens system according to another modified embodiment.

FIG. 4 is a diagram of a lens system 614 in which three or more lenses are combined. The lens system 614 includes at least one lens which is formed of the negative refractive index medium. Moreover, the lens system 614 has a combination of lenses which corresponds to any one combination in table 1.

Consequently, there is an effect of reducing the curvature of field. Moreover, particularly, when a refractive index of two lenses have opposite signs, the effect of enhancing the absolute value of power of the lens system can be shown when the curvature of field is eliminated.

In a case of an example in FIG. 4, when a relative refractive index of an ith lens with respect to a surrounding medium is let to be n'1, a focal length of the ith lens is let to be fi, a focal length of the entire lens system 614 is let to be fTN, and the number of lenses is let to be N, the curvature of field can be eliminated when the following expression is satisfied.

$$\sum_{i=1}^{N} \frac{1}{fi \cdot n'i} = 0 \qquad \text{expression 114}$$

Here, the lens system approximates to a system in which thin lenses are in a close contact. Practically, in many cases the following expression may be satisfied.

$$-\left|\frac{1}{3f_{TN}}\right| \leq \sum_{i=1}^{N} \frac{1}{fi \cdot n'i} \leq \left|\frac{1}{3f_{TN}}\right| \qquad \text{expression 115}$$

In an optical system such as an optical system with a narrow angle of view, the following expression may be satisfied.

$$-\left|\frac{1}{f_{TN}}\right| \leq \sum_{i=1}^{N} \frac{1}{fi \cdot n'i} \leq \left|\frac{1}{f_{TN}}\right| \qquad \text{expression 116}$$

In cases in which, for products in which the optical system is used, when the curvature of field is not much significant, the following expression may be satisfied.

$$-\left|\frac{10}{f_{TN}}\right| \leq \sum_{i=1}^{N} \frac{1}{fi \cdot n'i} \leq \left|\frac{10}{f_{TN}}\right| \qquad \text{expression 117}$$

Expression 115, expression 116, and expression 117 hold true even when N=2. Consequently, expression 115, expression 116, and expression 117 hold true for natural number N where n≧2. In this patent application, the focal length indicates a focal length in a medium around the lens.

It is desirable that the refractive index ns with respect to vacuum, of the negative refractive index medium 301 which forms the lens, satisfy the following expression 141.

$$-5 \leq ns \leq -0.3 \qquad \text{expression 141}$$

When ns exceeds an upper limit in expression 141, an absolute value of Petzval sum for the single lens is increased, and it is difficult to satisfy expression 109, expression 110, and expression 114.

When ns is lower than a lower limit in expression 141, making of the negative refractive index medium becomes difficult, and a cost of manufacturing becomes high.

Practically, in some cases the following expression 142 may be satisfied.

$$-10 \leq ns \leq -0.1 \qquad \text{expression 142}$$

When the following expression 143 is satisfied, it is more preferable.

$$-3 \leq ns \leq -0.5 \qquad \text{expression 143}$$

A numerical example of the embodiment in FIG. 1 will be described below.

n'1=−2 f1=20 μm n'2=1.5 f2=26.67 μm fTN=11.43 μm

A numerical example of the embodiment in FIG. 3 will be described below.

n'1=−1 f1=−50 mm n'2=1.8 f2=27.7778 mm fTN=62.5 mm

Figure 5:
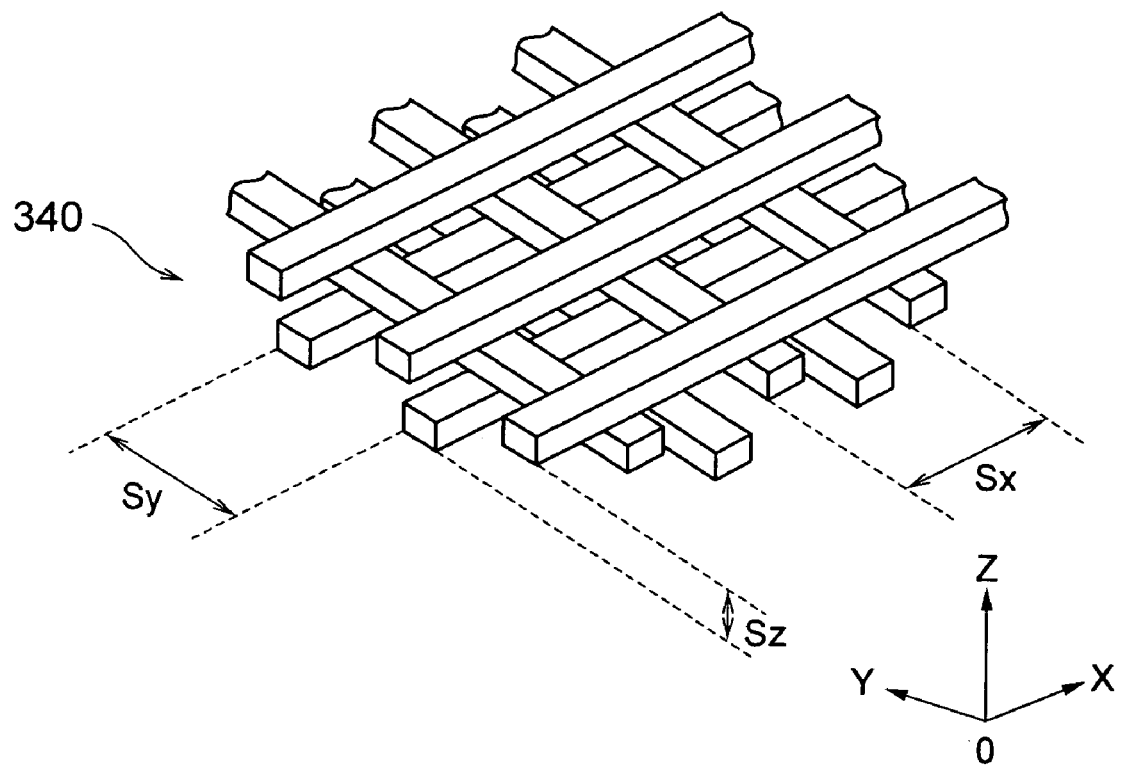
FIG. 5 is a diagram showing a first concrete example of a photonic crystal 340.
Figure 6:
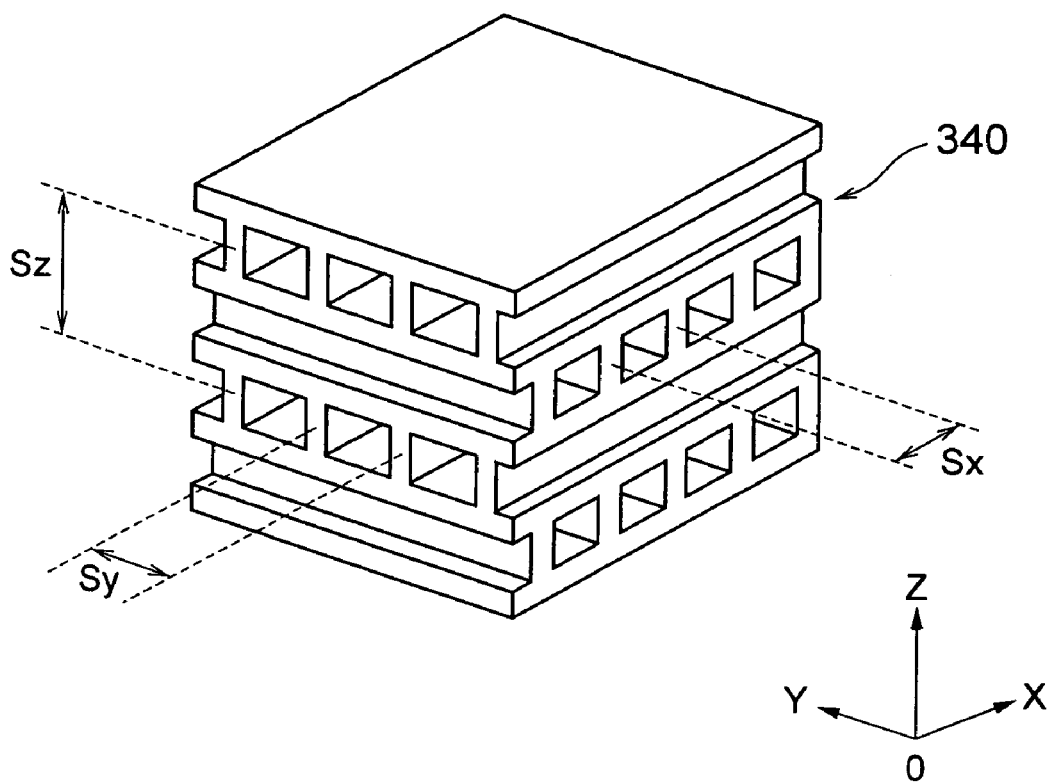
FIG. 6 is a diagram showing a second concrete example of the photonic crystal 340.
Figure 7:
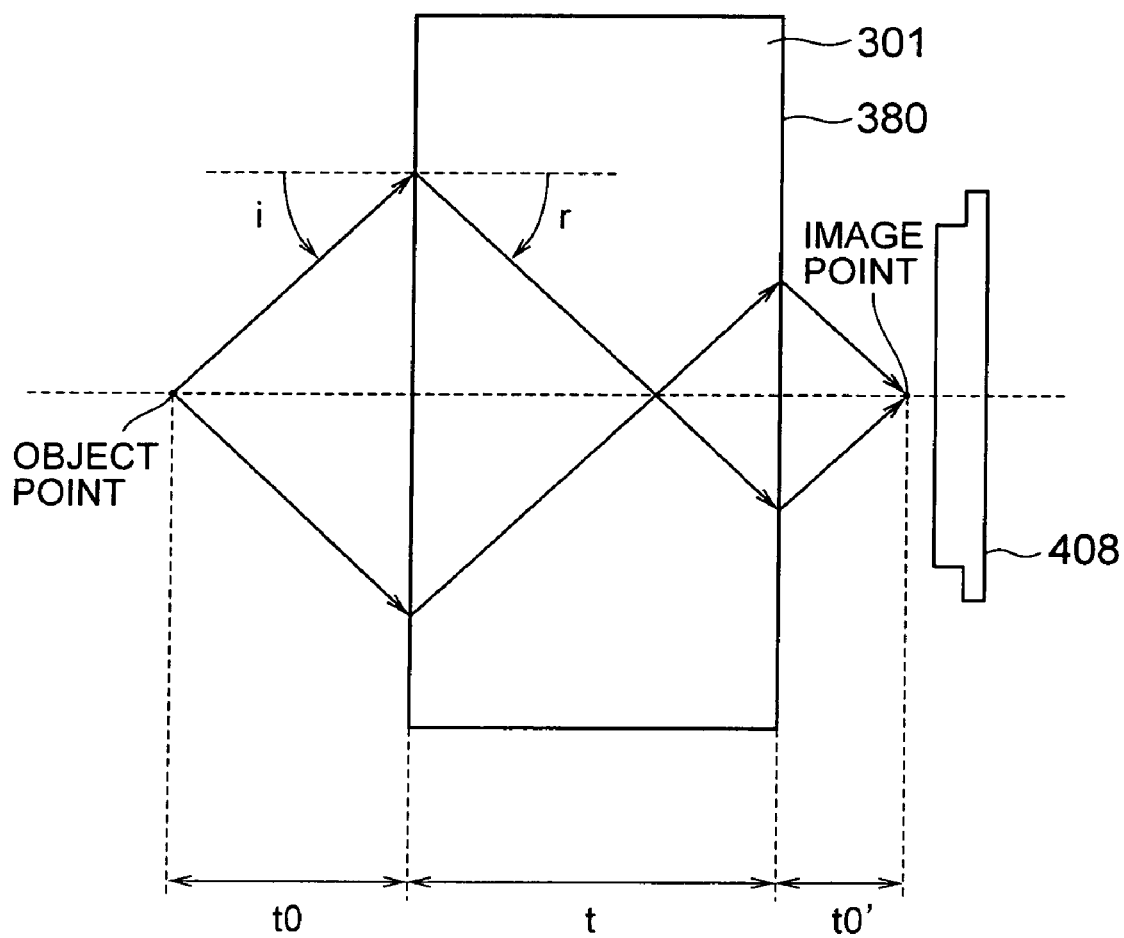
FIG. 7 is a diagram for describing an image formation by a plane-parallel plate 380 which is formed of a negative refractive index medium 301.
Figure 8:
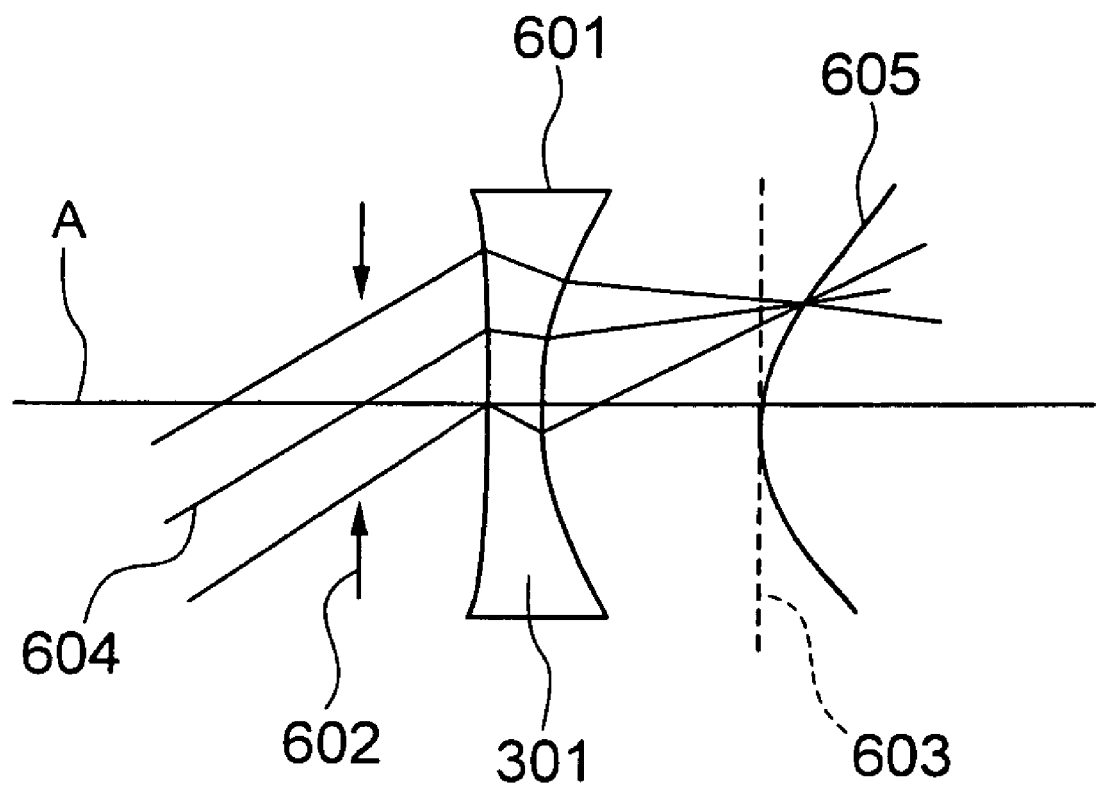
FIG. 8 is a diagram for describing a curvature of field.

Comment which can be made commonly for the present invention will be described below. A photonic crystal is a concrete example of a medium of the negative refractive index medium. FIG. 5 shows a first concrete example of a photonic crystal 340, and FIG. 6 is a second concrete example of the photonic crystal 340. As shown in FIG. 5 and FIG. 6, the photonic crystal 340 is made of a medium having a periodic structure in a range of about λ to several tenths of λ by a method such as a lithography. The material used for making the photonic crystal is a dielectric material such as $SiO_2$, $TiO_2$, a synthetic resin such as acrylic, polycarbonate, and GaAs. Here, λ is a wavelength of light which is used. In the diagram, a value of repeated periods Sx, Sy, and Sz in X, Y, and Z directions is in a range of λ to several tenths of λ. It has been known that it is possible to realize the negative refractive index near a edge of a photonic band of the photonic crystal (refer to Non-patent Literature "Physical Review B, Volume 62, Page 10696 (2000)" by M. Notomi). It is preferable that the Z direction in the diagram is let to be an optical axis of the optical system.

A Z axis is a direction of an axis for which a rotational symmetry of the photonic crystal is optimum.

It is desirable that Sx, Sy, and Sz satisfy one of the following expressions (5-1), (5-2), and (5-3).

$$\lambda/10 < Sx < \lambda \qquad (5\text{-}1)$$

$$\lambda/10 < Sy < \lambda \qquad \text{expression (5-2)}$$

$$\lambda/10 < Sz < \lambda \qquad \text{expression (5-3)}$$

When values of Sx, Sy, and Sz exceed an upper limit or a lower limit, it can not function as a photonic crystal.

According to an application, one of the following expressions (5-4), (5-5), and (5-6) may be satisfied.

$$\lambda/30 < Sx < 4\lambda \qquad \text{expression (5-4)}$$

$$\lambda/30 < Sy < 4\lambda \qquad \text{expression (5-5)}$$

$$\lambda/30 < Sz < 4\lambda \qquad \text{expression (5-6)}$$

Regarding the negative refractive index medium, when a relative dielectric constant ∈ of the medium is negative, and also a relative permeability μ of the medium is negative, it has been known that the refractive index of the medium becomes as shown in the following expression.

$$-\sqrt{\in \mu}$$

Moreover, as the negative refractive index medium, a medium exhibiting negative refraction, a medium exhibiting approximately negative refraction such as thin films of silver, gold and copper, a medium exhibiting negative refraction in a specific direction of polarization, a medium having a chiral structure, and a medium having either the dielectric constant $\in$ or the permeability $\mu$ negative such as −1, may be used.

Moreover, sometimes the negative refractive index medium is also called as a left handed material. In this patent application, media including all of these negative refractive index medium, left handed material, the medium exhibiting approximately negative refraction, the medium exhibiting negative refraction in the specific direction of polarization, the medium having the spiral structure, and the medium having either the dielectric constant $\in$ or the permeability $\mu$ negative, are called as the medium exhibiting negative refraction. A medium exhibiting perfect imaging is also included in the media exhibiting negative refraction. Moreover, in a case of the medium having either the dielectric constant $\in$ or the permeability $\mu$ negative, the following expressions (5-6-1) and (5-6-2) in which $\in'$ and $\mu'$ are defined, may be satisfied.

$$\in' = \in/\in c \qquad \text{expression (5-6-1)}$$

$$\mu' = \mu/\mu c \qquad \text{expression (5-6-2)}$$

where $\in c$ is a dielectric constant of the medium around the lens, and $\mu c$ is a permeability of the medium around the lens.

In this case, the following expression (5-7) may be satisfied.

$$-2 \leq \in' \leq -0.5 \qquad \text{expression (5-7)}$$

According to an application, the following expression (5-8) may also be satisfied.

$$-8.0 \leq \in' \leq -0.2 \qquad \text{expression (5-8)}$$

In a case of a medium for which the magnetic permeability is almost −1, $\in'$ in expression (5-7) and expression (5-8) may be replaced by $\mu'$. Moreover, when a term "perfect imaging" is used in this patent application, a case in which 100% perfect imaging is not performed is also included. For example, a case in which a spatial frequency several times higher than a standard spatial frequency which is determined by the diffraction limit can be resolved is also included in the perfect imaging. Further, a case in which a spatial frequency increased several tens of percent of the standard spatial frequency which is determined by the diffraction limit can be resolved is also included in the perfect imaging.

Moreover, a shape of the lens may not be a shape of a normal three-dimensional lens, and a two-dimensional lens may also be used. In other words, a cylindrical lens may also be used. Furthermore, various shapes of a lens surface such as a spherical surface, an aspheric surface, an anamorphic surface, and a free-formed surface are applicable. In a case of the anamorphic surface and the free-formed surface etc., the elimination of the curvature of field with respect to a focal length which is determined by a local curvature may be taken into consideration.

As a wavelength of light used, a light source of a continuous spectrum, a white light source, a sum of monochromatic lights, a low coherence light source, such as a super luminescent diode, a gas laser, and a semiconductor laser may be used.

As a wavelength of light used, from a point of view of an ability to transmit through air, and an easiness of procurement of the light source, a range of 0.1 μm to 3 μm may be used. A visible wavelength may be used as it is easy to use the visible wavelength. Electromagnetic waves such as the microwaves and the terahertz waves may be used. Infra-red light and ultra-violet light may be used.

The wavelength of 0.6 μm or less is even better, since a resolution can be improved easily for this wavelength.

A comment which can be made commonly for the embodiments of this patent application is that the surrounding of the negative refractive index medium 301 or 302 may be let to be a vacuum, water, oil, and a synthetic resin such as acrylic.

When the surrounding of the negative refractive index medium 301 or 302 is vacuum, it is possible to use vacuum-ultraviolet light, and there is no decline in the resolution due to a fluctuation of air. Therefore, a favorable imaging property is achieved. Letting the surrounding to be air is favorable as it is easy to make an optical apparatus, and the handling becomes easy. In an optical apparatus, only an optical path around the negative refractive index lens 301 or 302 may be let to be a vacuum, and the remaining part of the optical apparatus may be disposed in air.

It is possible to achieve an optical apparatus which is easy to handle, and has a favorable image forming capability.

A refractive index of air with respect to vacuum is let to be nA. The refractive index of air nA at an atmospheric pressure 1 (bar), when the wavelength is 500 nm, is nA=1.0002818.

A thickness of a lens formed of the negative refractive index medium is let to be t'. The thickness t' will be described below. The thickness t' may be such that the following expression (15-2) is satisfied $$0.1\ \text{mm} \leq t' \leq 300\ \text{mm} \qquad \text{expression (15-2)}$$

When a value of t' exceeds an upper limit, the (size of the) optical apparatus is increased, and the manufacturing becomes difficult.

According to the product, the value of thickness t' shown by the following expression (16-2) is acceptable.

$$0.01\ \text{mm} \leq t' \leq 300\ \text{mm} \qquad \text{expression (16-2)}$$

According to the application, the value of thickness t' shown by the following equation (17) is also acceptable.

$$1100\ \text{nm} \leq t' \leq 200\ \text{mm} \qquad \text{expression (17)}$$

Or, when the light is absorbed in the negative refractive index medium 301, the value of thickness t' shown by the following expression (18) is also acceptable.

$$30\ \text{nm} \leq t' \leq 50\ \text{mm} \qquad \text{expression (18)}$$

Moreover, when expression 15-2 or expression 16-2 is satisfied, since the mechanical strength of the negative refractive index medium as an optical element is enhanced, handling during assembling of the optical apparatus becomes easy.

Or it is favorable since there is a possibility that a substrate or a lens forming the negative refractive index medium becomes unnecessary.

An upper limit value of t' in expressions (17) and (18) may be let to be 0.01 mm. With 0.01 mm as the upper limit value of t', it may be possible to manufacture the negative refractive index medium as a thin film by a method such as a vapor deposition or a sputtering.

Manufacturing the photonic crystal by a self-cloning method can be taken into consideration (refer to Literature "Optronics, July, 2001 issue, Page 197" by Sato and Kawakami)

It is possible to use the lens system of this patent application for various types of optical apparatuses.

Finally, definitions of technical terms used in these embodiments will be made below.

An optical apparatus means an apparatus which includes an optical system or an optical element. The optical apparatus may not function singly. In other words, it may be a part of an apparatus.

Optical apparatuses include apparatuses such as an imaging apparatus, an observing apparatus, a display apparatus, an illuminating apparatus, a signal processing apparatus, an optical information processing apparatus, a projection apparatus, and a projection and exposing apparatus.

Examples of the imaging apparatus are a film camera, a digital camera, a digital camera for PDA (personal digital assistance), a robot eye, an interchangeable-lens digital single-lens reflex camera, a TV (television) camera, a video recording apparatus, an electronic video recording apparatus, a camcorder, a VTR (video tape recording) camera, a digital camera of a mobile telephone, a TV camera of a mobile telephone, an electronic endoscope, a capsule endoscope, a car-mounted camera, a camera of an artificial satellite, a camera of a planetary probe, a camera of a space probe, a camera of a monitoring device, various sensors of eye, a digital camera of a sound recording apparatus, an artificial light, a laser scanning microscope, a projection and exposing apparatus, a stepper, an aligner, an optical probe microscope, and a near-field microscope. The digital camera, a card-shaped camera, a TV camera, the VTR camera, the video recording camera, the digital camera of the mobile telephone, the TV camera of the mobile telephone, the car-mounted camera, the camera of the artificial satellite, the camera of the planetary probe, the camera of the space probe, the digital camera of the sound recording apparatus are examples of the electronic imaging apparatus.

Examples of the observing apparatus are a microscope, a telescope, spectacles, binoculars, loupe (magnifying lens), a fiber scope, a finder, a view finder, contact lenses, an intraocular lens, and the artificial sight.

Examples of the display apparatus are a liquid crystal display, the view finder, a game machine (PLAY STATION manufactured by SONY Corporation), a video projector, a liquid crystal projector, a head-mounted display, a PDA (portable information terminal), the mobile telephone, and the artificial sight.

Examples of the projection apparatus are the video projector and the liquid crystal projector.

Examples of the illuminating apparatus are a strobe of a camera, a head light of an automobile, a light source of an endoscope, and a light source of a microscope.

Examples of the signal processing apparatus are the mobile telephones a personal computer, a game machine, a reading and writing apparatus of an optical disc, a computing unit of an optical computer, an optical interconnection apparatus, an optical information processing apparatus, an optical LSI (large scale integration), an optical computer, and a PDA.

An information transmitting apparatus means an apparatus to which some sort of information can be input, and which can transmit this information. The information may be input from the mobile telephone, a fixed-line telephone, a remote control of the game machine, a television, a radio-cassette player (recorder), a stereo, the personal computer, and a keyboard, a mouse, and a touch panel of the personal computer.

It also includes a display, a monitor of the personal computer, and a television monitor with the imaging device.

The information transmitting apparatus is included in the signal processing apparatus.

The imaging device means a CCD (charge coupled device), a solid imaging device, and a photographic film. Moreover, the plane-parallel plate is let to be included in one single prism. A change in a viewer (viewing person) is let to include a change in visibility. A change in an object is let to include a change in an object distance, a movement of the object, a motion and vibration of the object, and a blurring of the object. The imaging device, a wafer, an optical disc, and a silver salt film are examples of an image forming member.

A definition of an extended curved surface is as follows.

The extended curved surface may have any shape apart from a shape of a spherical surface, such as a spherical surface which is eccentric with respect to an optical axis, a flat surface, a rotationally symmetrical aspheric surface, or an aspheric surface, an aspheric surface having only one symmetrical surface, an aspheric surface having no symmetrical surface, a free-form surface, and a surface having a point and a line which are not differentiable. It may be any surface such as a reflecting surface and a refracting surface, which have some sort of effect on light.

In the present invention, all these surfaces are generically called as an extended curved surface.

An image forming optical system indicates an optical system such as an imaging optical system, an observing optical system, a projection optical system, a projection and exposing optical system, a display optical system, and a signal processing optical system.

A lens for imaging, of the digital camera is an example of the imaging optical system.

A microscope optical system and a telescope optical system are examples of the observing optical system.

An optical system of the video projector, an optical system for lithography, a reading and writing optical system of an optical disc, and an optical system of an optical pick-up are examples of the projection optical system.

The optical system for lithography is an example of the projection and exposing optical system.

An optical system of the view finder of the video camera is an example of the display optical system.

A reading and writing optical system and the optical system of the optical pick-up are examples of the signal processing optical system.

The optical element indicates a lens, an aspheric lens, a mirror, a prism, a free-form surface prism, a diffraction optical grating (DOE), and a heterogeneous lens. The plane-parallel plate is also an example of the optical element.

According to the present invention, it is possible to provide a lens system in which, a negative refractive index medium for which the curvature of field is reduced.

The present invention, moreover, has the following various characteristics.

(Note)

20. A lens system comprising:

a first lens formed of a medium exhibiting negative refraction; and a second lens which is formed of a medium having a positive refractive index.

20-1. The lens system according to No. 20, wherein a sign of a focal length of the first lens which is formed of the medium exhibiting negative refraction is same as a sign of a focal length of the second lens which is formed of the medium having the positive refractive index.

20-2. The lens system according to No. 20-1, wherein the focal length of the first lens which is formed of the medium exhibiting negative refraction is positive, and the focal length of the second lens which is formed of the medium having the positive refractive index is positive.

20-3 The lens system according to No. 20-1, wherein
the focal length of the first lens which is formed of the medium exhibiting negative refraction is negative, and the focal length of the second lens which is formed of the medium having the positive refractive index is negative.

30. A lens system comprising:
a first lens which is formed of a medium exhibiting negative refraction; and
a second lens which is formed of a medium exhibiting negative refraction.

30-1. The lens system according to No. 30, wherein
a sign of a focal length of the first lens which is formed of the medium exhibiting negative refraction differs from a sign of a focal length of the lens which is formed of the medium exhibiting negative refraction.

30-2. The lens system according to No. 30-1, wherein
the focal length of the first lens which is formed of the medium exhibiting negative refraction is positive, and the focal length of the second lens which is formed of the medium exhibiting negative refraction is negative.

40. The lens system according to one of Nos. 20 to 20-3, and 30 to 30-2, which includes the first lens and the second lens.

50. The lens system according to one of Nos. 20 to 20-3, 30 to 30-2, and 40, which satisfy expression 117.

110. An optical apparatus comprising:
the lens system according to one of Nos. 20 to 20-3, 30 to 30-2, 40 and 50.

111. A microscope comprising:
the lens system according to one of Nos. 20 to 20-3, 30 to 30-2, 40, and 50.

112. An optical disc apparatus comprising:
the lens system according to one of Nos. 20 to 20-3, 30 to 30-2, 40, and 50.

113. An observation apparatus comprising:
the lens system according to one of Nos. 20 to 20-3, 30 to 30-2, 40, and 50.

114. An imaging apparatus comprising:
an imaging device in addition to the lens system according to one of Nos. 20 to 20-3, 30 to 30-2, 40, and 50.

115. A projection apparatus comprising:
the lens system according to one of Nos. 20 to 20-3, 30 to 30-2, 40, and 50.

120. The lens system or the apparatus according to one of Nos. 20 to 20-3, 30 to 30-2, 40, 50, and 110 to 115, wherein
the medium exhibiting negative refraction is a negative refractive index medium.

125. The lens system or the apparatus according to one of Nos. 20 to 20-3, 30 to 30-2, 40, 50, and 110 to 115, wherein
the medium exhibiting negative refraction is a medium which exhibits properties of perfect imaging.

130. The lens system or the apparatus according to one of Nos. 20 to 20-3, 30 to 30-2, 40, 50, and 110 to 115, wherein
the medium exhibiting the negative refraction is a photonic crystal.

130-2. The lens system or the apparatus according to No. 130, wherein
the photonic crystal is used as the medium exhibiting negative refraction, and an axis of the photonic crystal for which a rotational symmetry is optimum is directed toward an optical axis of the optical system.

131. The lens system or the apparatus according to one of Nos. 20 to 20-3, 30 to 30-2, 40, 50, and 110 to 115, wherein
the medium exhibiting negative refraction satisfies expressions 5 to 8.

132. The lens system or the apparatus according to one of Nos. 20 to 20-3, 30 to 30-2, 40, 50, and 110 to 115, wherein
a thickness of the lens formed of the medium exhibiting negative refraction satisfies any one of expressions 15-2, 16-2, 17, and 18.

133. The lens system or the apparatus according to one of Nos. 20 to 20-3, 30 to 30-2, 40, 50, 110 to 115, 120, 125, 130 to 130-2, 131, and 132, wherein
a refractive index of the medium exhibiting negative refraction satisfies expression 142.

134. The lens system or the apparatus according to one of Nos. 20 to 20-3, 30 to 30-2, 40, 50, 110 to 115, 120, 125, 130 to 130-2, 131, 132, and 133, wherein
a wavelength which is used is a visible wavelength.

What is claimed is:

1. A lens system, comprising:
a first lens which is formed of a medium exhibiting negative refraction; and
a second lens which is formed of a medium having a positive refractive index,
wherein a sign of a focal length of the first lens which is formed of the medium exhibiting negative refraction is same as a sign of a focal length of the second lens which is formed of the medium having the positive refractive index.

2. The lens system according to claim 1, wherein
the focal length of the first lens which is formed of the medium exhibiting negative refraction is positive, and the focal length of the second lens which is formed of the medium having the positive refractive index is positive.

3. The lens system according to claim 1, wherein
the focal length of the first lens which is formed of the medium exhibiting negative refraction is negative, and the focal length of the second lens which is formed of the medium having the positive refractive index is negative.

4. A lens system comprising:
a first lens which is formed of a medium exhibiting negative refraction, and a second lens which is formed of a medium exhibiting negative refraction.

5. The lens system according to claim 4, wherein
a sign of a focal length of the first lens which is formed of the medium exhibiting negative refraction differs from a sign of a focal length of the second lens which is formed of the medium exhibiting negative refraction.

6. The lens system according to claim 5, wherein
the focal length of the first lens which is formed of the medium exhibiting negative refraction is positive, and the focal length of the second lens which is formed of the medium exhibiting negative refraction is negative.

7. The lens system according to one of claims 1 and 4, which includes the first lens and the second lens.

8. The lens system according to claim 1 or 4 which satisfy the following expression 117

$$-|10/f_{TN}| \leq \Sigma 1/(f_i \cdot n_i) \leq |10/f_{TN}| \qquad \text{expression 117}$$

where,
$f_{TN}$ is a focal length of the lens system,
fi is a focal length of an ith lens,
ni is a refractive index of the ith lens, and
N is the number of lenses included in the lens system.

9. An optical apparatus comprising:
the lens system according to claim 1 or claim 4.

10. The lens system according to one of claims 1 and 4, wherein
the medium exhibiting negative refraction is a negative refractive index medium.

11. The lens system according to one of claims 1 and 4, wherein
the medium exhibiting negative refraction is a medium exhibiting properties of a perfect imaging.

12. The lens system according to one of claims 1 and 4, wherein
the medium exhibiting negative refraction is a photonic crystal.

13. The lens system according to claim 12, wherein
a photonic crystal is used as the medium exhibiting negative refraction, and
an axis of the photonic crystal having an optimum rotational symmetry is directed in an optical axis direction of an optical system.

14. The lens system according to claim 1 or claim 4, wherein
the medium exhibiting negative refraction satisfies expression 5-8:

$$-8.0 \leq \epsilon' \leq -0.2 \qquad \text{expression (5-8)}$$

where
$\epsilon' = \epsilon/\epsilon_c$,
$\epsilon$ is a dielectric constant of the medium of the lens, and $\epsilon_c$ is a dielectric constant of the medium around the lens.

15. The lens system according to claim 1 or claim 4, wherein
a thickness of the lens which is formed of the medium exhibiting negative refraction satisfies any one of expressions 15-2, 16-2, 17, and 18:

$$0.1 \text{ mm} \leq t' \leq 300 \text{ mm} \qquad \text{expression (15-2)}$$

$$0.01 \text{ mm} \leq t' \leq 300 \text{ mm} \qquad \text{expression (16-2)}$$

$$1100 \text{ nm} \leq t' \leq 200 \text{ mm} \qquad \text{expression (17)}$$

$$30 \text{ nm} \leq t' \leq 50 \text{ nm} \qquad \text{expression (18)}$$

where, t' is the thickness of the lens which is formed of the medium exhibiting negative refraction.

16. The lens system according to claim 1 or claim 4, wherein
a refractive index of the medium exhibiting negative refraction satisfies expression 142

$$-10 \leq n_s \leq -0.1 \qquad \text{expression 142}$$

where $n_s$ is a refractive index of the medium exhibiting negative refraction, with respect to vacuum.

17. The lens system according to claim 1 or claim 4, wherein
a wavelength which is used is a visible wavelength.

* * * * *